(12) United States Patent
Smith et al.

(10) Patent No.: US 8,176,212 B1
(45) Date of Patent: May 8, 2012

(54) METHOD AND SYSTEM FOR HIERARCHICAL AND JOINABLE BEHAVIOR CONTAINERS FOR RECONFIGURABLE COMPUTING

(75) Inventors: Steven P. Smith, Austin, TX (US); Justin Braun, Austin, TX (US)

(73) Assignee: Quickflex, Inc., San Antonio, TX (US)

( * ) Notice: Subject to any disclaimer, the term of this patent is extended or adjusted under 35 U.S.C. 154(b) by 77 days.

(21) Appl. No.: 12/859,173

(22) Filed: Aug. 18, 2010

Related U.S. Application Data (60) Provisional application No. 61/234,820, filed on Aug. 18, 2009.

(51) Int. Cl.
*G06F 3/00* (2006.01)
*G06F 17/50* (2006.01)
(52) U.S. Cl. ............... 710/8; 716/104; 716/117; 712/15
(58) Field of Classification Search ............... 710/8–10; 712/5; 713/100; 716/104–117
See application file for complete search history.

(56) References Cited

U.S. PATENT DOCUMENTS

| | | | | |
|---|---|---|---|---|
| 5,477,475 | A * | 12/1995 | Sample et al. | 716/104 |
| 6,049,879 | A * | 4/2000 | Davis et al. | 713/300 |
| 6,191,876 | B1 * | 2/2001 | Popovich | 359/15 |
| 6,304,101 | B1 * | 10/2001 | Nishihara | 326/41 |
| 6,536,028 | B1 * | 3/2003 | Katsioulas et al. | 716/125 |
| 6,631,502 | B2 * | 10/2003 | Buffet et al. | 716/111 |
| 7,188,163 | B2 * | 3/2007 | Srinivasan et al. | 709/221 |
| 7,412,342 | B2 * | 8/2008 | Sturges et al. | 702/117 |
| 7,600,210 | B1 * | 10/2009 | Mason et al. | 716/138 |
| 7,647,516 | B2 * | 1/2010 | Ranganathan et al. | 713/320 |
| 7,809,936 | B2 * | 10/2010 | Einloth et al. | 713/100 |
| 7,949,860 | B2 * | 5/2011 | Maeda et al. | 712/229 |
| 8,006,108 | B2 * | 8/2011 | Brey et al. | 713/320 |

* cited by examiner

*Primary Examiner* — Christopher B Shin
(74) *Attorney, Agent, or Firm* — Hulsey, P.C.; William N. Hulsey, III; John Ryan Cecil Wood (57) ABSTRACT

A method and system for the flexible sizing of behavior containers on a reconfigurable computing resource through the use of hierarchically nested as well as joinable and separable containers is provided.

2 Claims, 5 Drawing Sheets

METHOD AND SYSTEM FOR HIERARCHICAL AND JOINABLE BEHAVIOR CONTAINERS FOR RECONFIGURABLE COMPUTING

This application claims the benefit of provisional patent application 61/234,820 filed on Aug. 18, 2009, which is hereby incorporated by reference.

FIELD

This disclosure relates in general to the field of reconfigurable computing. And more particularly, to the technical field of reconfigurable computing based on field programmable gate array (FPGA) devices.

BACKGROUND

Often, hardware configurations for reconfigurable computing systems are designed for a specific single application or a cooperating set of behaviors to run at one time on the reconfigurable computing system. And although a particular application's configuration may contain multiple hardware functions, the configuration is not usually designed to allow different unrelated applications to simultaneously share a single reconfigurable computing Field Programmable Gate Array ("FPGA") level resource. The ability for a single configuration file to contain multiple independent hardware objects that interface to multiple application programs running simultaneously on a host system is increasingly important as reconfigurable computing technology migrates to mainstream and special purpose high performance computing environments.

Methods disclosed in U.S. Pat. No. 6,539,438, assigned to common assignee QuickFlex, Inc. and which is herein incorporated by reference, address a means for making reconfigurable computing resources dynamically reprogrammable from application software instances. This patent discloses a means by which middleware can provide access from multiple simultaneously executing software applications to one or more reconfigurable computing resources, each reconfigurable computing resource hosting one or more hardware behaviors that may be loaded dynamically.

Further, some currently available FPGA devices support configuration functionality known as partial dynamic reconfiguration. Partial dynamic reconfiguration makes it possible to load hardware behaviors into a portion of the FPGA while the remainder of the FPGA operates in normal functional (i.e., non-configuration) mode. The emergence of this technology enables the continuous exploitation of reconfigurable computing resources even while portions of those resources are being loaded with new hardware behaviors thereby improving both the flexibility and computational effectiveness of the underlying reconfigurable computing resource utilized in U.S. Pat. No. 6,539,438.

However, the partial dynamic reconfiguration capabilities currently available largely rely on the identification and usage of dedicated physical regions of the underlying FPGA device available for partial reconfiguration as a single operation. The location and structure of the boundaries of these regions must follow certain design rules to ensure that there is no electrical damage to the device as a result of temporary drive conflicts during reconfiguration. These rules vary from device family to device family, but generally are meant to ensure that no circumstance can arise during reconfiguration in which a single electrical network on the device has more than a single active driver.

A "bus macro" is a gate structure that, when used as a boundary to cordon off partially reconfigurable regions of an FPGA device, ensures that no drive conflicts or other potential sources of electrical damage to the device can occur during partial reconfiguration. These bus macro gate structures are placed at regular locations within the device and are typically found at the boundaries either of columns or banks—terms used for the individually addressable elements of the configuration fabric in FPGA devices (depending upon the device family).

As a result of the requirement to abide by the electrical rules needed to protect FPGA devices during partial dynamic reconfiguration, it becomes necessary to identify the specific regions that will be used for the partial dynamic reconfiguration. In practice, this has most often meant that at most one or two areas of the device are set aside for dynamic partial reconfiguration, with pre-determined, fixed boundaries—thus the usable region sizes are pre-set. Yet many applications and computing environments host hardware behaviors that may vary widely in both size and complexity, typically leading to highly inefficient use of the partially reconfigurable regions, with some behaviors requiring only a small percentage of the area available within a region.

SUMMARY

Therefore a need has arisen for substantially improving the efficacy and efficiency of the dynamic use of reconfigurable computing resources in systems comprising both general-purpose software-programmable computing resources and one or more reconfigurable computing resources. In accordance with the disclosed subject matter, a method and system for the flexible sizing of hardware behavior containers on a reconfigurable computing resource is provided which substantially eliminates or reduces disadvantages and problems associated with previously developed partially reconfigurable computing resources.

The disclosed subject matter provides a means for the flexible sizing of behavior containers on a reconfigurable computing resource through the use of hierarchically nested as well as joinable and separable containers. The efficiency and efficacy of the dynamic use of a reconfigurable computing resource is improved by increasing both the effective number and range of sizes of behavior containers (i.e., the discrete regions of the reconfigurable computing device that may be individually and partially reprogrammed).

The methods and systems that embody the present disclosure—flexible sizing of hardware behavior containers in reconfigurable computing devices supporting partial dynamic reconfiguration based on joining by abutment and joining through hierarchy—both eliminate the manifest shortcomings of fixed-size partially reconfigurable regions and facilitate a much more powerful and fine-control over the reconfigurable computing resource than is afforded by the current technique of designating a fixed area or areas for dynamic reconfiguration. The reconfigurable logic manager is then responsible for making dynamic determinations of the best current allocation of the available hierarchical hardware behavior containers on the FPGA based on the current workload and requirements of the application software instances.

The disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGURES and detailed description. It is intended that all such additional systems, methods, features and advantages included within this description, be within the scope of the accompanying claims

BRIEF DESCRIPTIONS OF THE DRAWINGS

For a more complete understanding of the disclosed subject matter and advantages thereof, reference is now made to the following description taken in conjunction with the accompanying drawings in which like reference numbers indicate like features and wherein.

DETAILED DESCRIPTION OF THE SPECIFIC EMBODIMENTS

The following description is not to be taken in a limiting sense, but is made for the purpose of describing the general principles of the present disclosure. The scope of the present disclosure should be determined with reference to the claims. Exemplary embodiments of the present disclosure are illustrated in the drawings, like numbers being used to refer to like and corresponding parts of the various drawings. And although described with reference to gates and bus macros, any inherent electrical division of an FPGA may be used to define a behavior container boundary.

Figure 1:
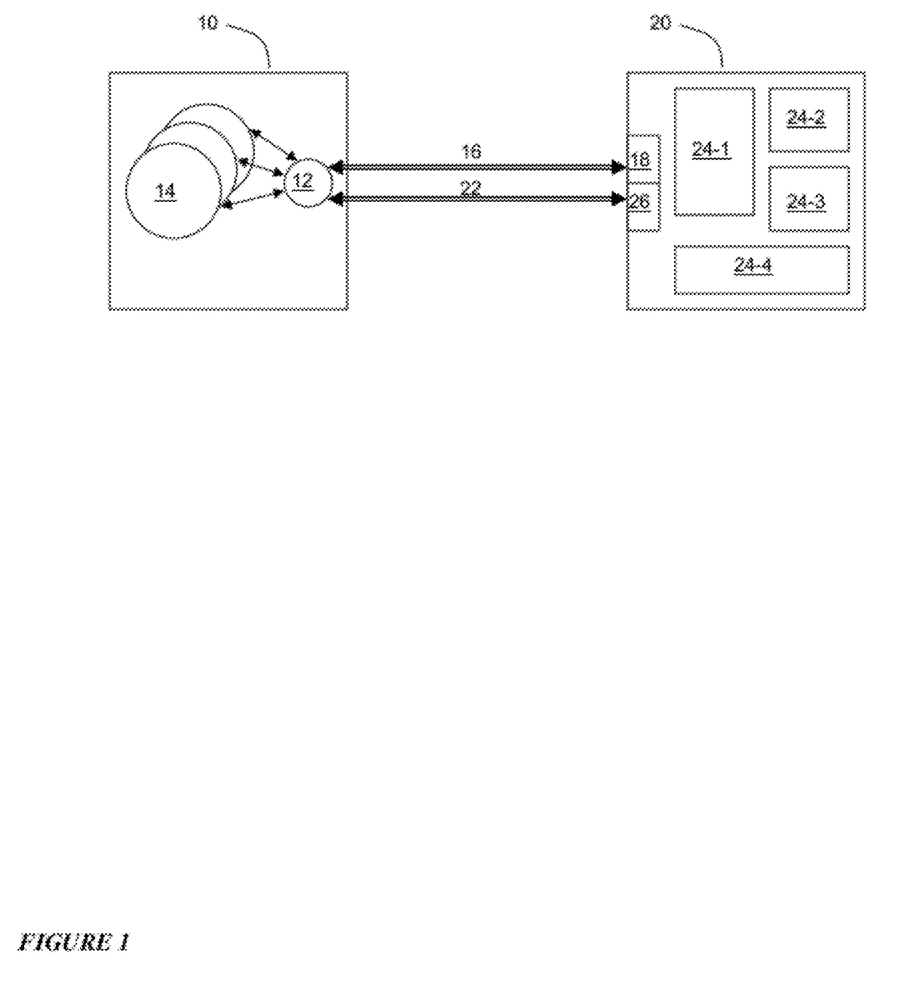
FIG. 1 is a diagram depicting an embodiment of a system architecture in accordance with the disclosed subject matter.

FIG. 1 is a diagram depicting an embodiment of a system architecture in accordance with the disclosed subject matter. Software programmable computing device 10 hosts reconfigurable logic manager 12 (comprising a reconfigurable computing interface and management software) that manages reconfigurable computing device 20 via configuration channel 16 connected to configuration interface port 18 and operational channel 22 connected to operational interface port 26. Software programmable computing device 10 may also host one or more software applications, such as software application 14, that with the assistance of reconfigurable logic manager 12, exploit functional behaviors hosted by reconfigurable computing device 20. These functional behaviors may be loaded into reconfigurable computing device 20 dynamically as they are required by executing the software applications, such as software application 14, on software programmable computing device 10.

When an executing application requests a specific hardware behavior, reconfigurable logic manager 12 first determines if the behavior is already loaded into reconfigurable computing device 20. If it is not, then reconfigurable logic manager 12 controls configuration channel 16 between software programmable computing device 10 and reconfigurable computing device 20 to load the hardware behavior requested by the requesting executing application. Reconfigurable logic manager maintains state information regarding currently available partial reconfigurable regions, shown as partial reconfigurable regions 24-1, 24-2, 24-3, and 24-4, and selects the most appropriate region for the requested hardware behavior. This is typically based only on which region affords the best fit (in some complex environments, other factors such as clock speed, interface bus width, and other criteria may also drive the assignment process). Because the partially reconfigurable regions are used to host specific hardware behaviors, they are referred to as behavior containers.

The actual loading of the requested hardware behavior is dependent upon the nature of the interface between software programmable computing device 10 and reconfigurable computing device 20, but typically entails the execution of a software-based finite state machine that provides the required control inputs to configuration channel 16 on reconfigurable computing device 20 while also providing the stream of bits that represent the hardware behavior to be loaded into the target region in reconfigurable computing device 20 to configuration interface port 18. Note that some configuration ports on reconfigurable computing device 20 are always available so long as the device is powered, while others may require the pre-loading of supporting hardware behaviors. On some devices, the Internal Configuration Access Port (ICAP) implements a configuration port that is only made functional by the presence of an ICAP controller hardware behavior.

Once the hardware behavior is completely loaded into one of the partially reconfigurable regions, such as shown partially reconfigurable regions 24-1, 24-2, 24-3, or 24-4, reconfigurable computing interface and management software 12 passes input data from the executing application that requested access to the behavior over operational channel 22 to reconfigurable computing device 20 hosting the operational interface port 26. Importantly, operational channel 22 and operational interface port 26 may or may not be different from configuration interface port 18 which connects software programmable computing device 10 to reconfigurable computing device 20. Once the hardware behavior in question has received the input data, reconfigurable logic manager 12 signals the hardware behavior to commence processing of the newly arrived input data.

While the hardware behavior performs its function using the input data received from the executing software application, reconfigurable logic manager 12 may either pass control immediately back to the calling application software instance thereby enabling it to continue work while the hardware behavior proceeds in parallel on reconfigurable computing device 20, or reconfigurable logic manager 12 may block the calling application software instance until the hardware behavior signals the reconfigurable logic manager 12 that its computation has completed (or alternatively that an error has occurred while processing). The signals for completion or error may be stored on operational interface port 26 and are passed to the middleware via operational channel 22, and are both monitored and received by the reconfigurable logic manager 12.

In the event that a completion signal is received across operational channel 22 and operational interface port 26 by reconfigurable logic manager 12, if the original call was blocking (i.e., the calling application waits without proceeding until the result is returned) it is then passed back to the calling application which is then able to continue its normal execution. And if the originating call was a non-blocking request, then reconfigurable logic manager 12 will store the result data and await the calling software application instance's request to receive the result—at which point the data is passed to the calling application software instance.

In the event that a software application instance, such as software application instance 14, requests that a behavior be loaded into a reconfigurable computing resource for which there is not currently an available region (or behavior container), then the reconfigurable logic manager 12 will identify those regions capable of physically hosting the requested hardware behavior and determine if one of those such regions should have its current hardware behavior removed in order to make room for the loading of the newly requested hardware behavior. The reconfigurable logic manager 12 makes use of a priority mechanism for hardware behaviors based in part on their designated priority and in part on a priority indication inherited from the application software instance itself. This two-tiered priority scheme is designed to prevent the problem of priority inversion which can lead to deadlock.

If a currently loaded hardware behavior occupies a region (or behavior container) with sufficient room for a hardware behavior subsequently requested and if the currently loaded hardware behavior has both a lower priority than that of the subsequently requested behavior and a lower priority than any other region capable of hosting the subsequently requested behavior, then reconfigurable logic manager 12 will commence with the following logic to replace the currently loaded hardware behavior with the subsequently requested behavior. First, reconfigurable logic manager 12 will check to see if the hardware behavior to be replaced is currently in the idle state. If it is not in the idle state, then the reconfigurable logic manager 12 may either proceed with the replacement regardless—signaling the calling application software instance that an abort error has been forced—or, it may set a time-out interval value specific to that hardware behavior to provide sufficient time for the operation currently underway to complete thereby waiting briefly for current hardware behavior to return to the idle state. In the latter case, the reconfigurable logic manager 12 will awaken again either when the time-out interval has expired or when the hardware behavior to be replaced signals that its current task has completed or ended with an error. In the event that the current hardware behavior has completed, the results will be returned to the calling application software instance as described above. At this point, the hardware behavior replacement process is ready to proceed to the second step which picks up precisely where the basic hardware behavior loading sequence described above begins and continues in exactly the same manner.

Each hardware behavior container, shown in FIG. 1 as partially reconfigurable regions 24-1, 24-2, 24-3, or 24-4, connect to the operational channel 22 and interface channel 26 using the same interface signals and conventions. Typically, but not always, this connection will be a memory mapped bus interface with a bit-width appropriate to the platform, reconfigurable computing devices, and application profile found in the target computing environment. The interface supports reads and writes to registers within each of the hardware containers. A portion of the container's available memory-mapped address space will be reserved for use by loaded hardware behaviors so that behavior-specific data may be defined and passed to and from the application software instance. The present disclosure includes the use in these hardware behavior containers of dynamically assignable base addresses and address ranges. This feature enables the dynamic reassignment of addresses and ranges as the size and number of the hardware behavior containers changes based on workload—described in detail below. The dynamic memory address base and range assignment capability is paired with a dynamic memory range allocation capability that is a part of the reconfigurable logic manager 12.

In addition to providing a mechanism for the bidirectional transfer of data to and from a hardware behavior container and the hardware behaviors it may host, the hardware container interface may also provide a mechanism of signaling the reconfigurable logic manager 12 across operational channel that a task has completed or that an error has occurred. This mechanism typically takes the form of an interrupt signal that is monitored by the reconfigurable logic manager 12, again across the operational channel 22 and operational interface port 26. However, the signaling mechanism need not be present—in such cases, reconfigurable logic manager 12 will rely on intermittent queries or "polling" of the hardware behavior container interface to read a signal mapped into the hardware behavior container's register space to indicate when an operation has completed, when an error has occurred, when the container is empty, or when the hosted hardware behavior may be ready to accept more input data, depending on the hardware behavior container and on the hardware behavior it may currently be hosting. Mechanisms other than memory-mapped bus interfaces also may be fully compatible with the reconfigurable logic manager 12 so long as operational channel 22 and operational interface port 26 supports the alternative mechanism. High-speed serial interconnect, point-to-point interconnections, and Ethernet connections are three examples of viable mechanisms for realizing both the operational channel 22, configuration channel 16, and the hardware behavior container interfaces.

As described thus far, the exploitation of the one or more reconfigurable computing resources by application software instances using the reconfigurable logic manager has presumed the presence of a fixed set of hardware behavior containers or regions which determines the set of reconfigurable computing resource regions available to the set of application software instances executing on the host computing system. However, in circumstances where there may be a set of hardware behaviors that vary widely in required area in the host regions, inevitably either a very small hardware behavior is inefficiently occupying a large host region thereby making inefficient use of the available reconfigurable computing resource or there are multiple large hardware behaviors that continually demand access to the same individual or set of host hardware behavior regions leading to a condition called "thrashing" (in which the regions in question are continually overwritten with newly requested behaviors).

Thrashing is analogous to cache thrashing in general purpose computing systems—in which a number of different virtual addresses that are in high demand are all mapped to the same physical region in the host cache memory leading to frequent flushes and overwrites of the cache area in question and also causing degraded performance for the application software instances relying on the contested region in the cache. In reconfigurable FPGA's, this phenomenon presents an even greater challenge in that modern cache memories rely on a uniform, typically fixed, cache line size (i.e., their "region" size). However, in FPGA's the size of the regions available for the dynamic hosting of hardware behaviors are entirely variable within the broad constraints imposed by the electrical limitations of the underlying physical reconfigurable computing device (e.g. where the "bus macro" devices are located within the fabric of the FPGA). As a result, the selection of the set of hardware behavior containers is a fundamental factor influencing the optimality of any ensuing sequence of computations using the reconfigurable computing resources under the control of a software programmable computing host.

Because the execution characteristics of programs may be variable, along with the software application workload on any given system, there will be instances when the set of available partially reconfigurable regions is well-suited to the task set and as a result will demonstrate excellent performance. Yet there will also be instances when the fit is not optimal, resulting in poor performance and thrashing of the reconfigurable computing resources.

Figure 2A:
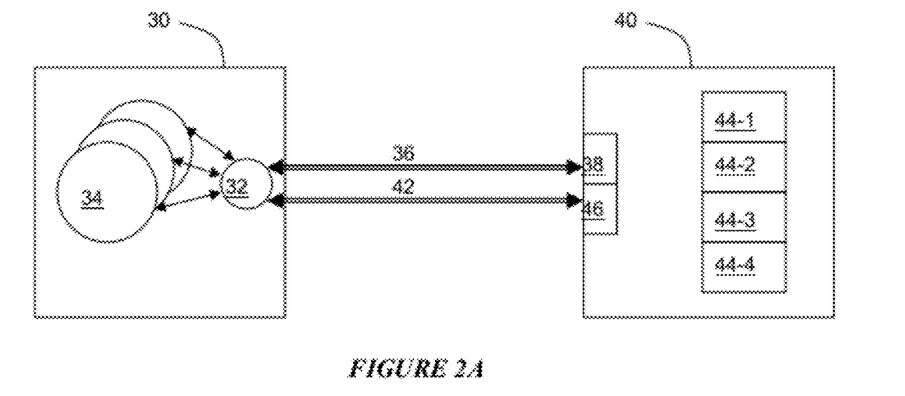
FIGS. 2A and 2B are diagrams of embodiments of the system architecture highlighting a non-hierarchical joining of adjacent hardware containers in accordance with the disclosed subject matter.
Figure 2B:
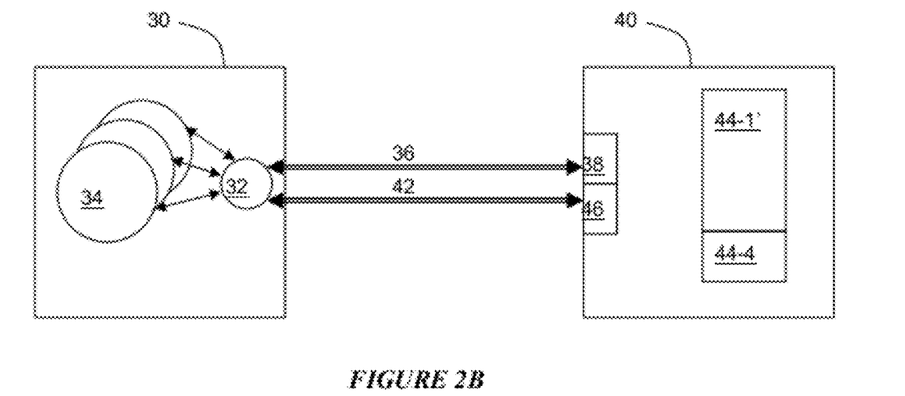

The disclosed subject matter directly addresses the inefficiencies resulting from fixed hardware behavior container sizes. FIGS. 2A and 2B are diagrams of embodiments of the system architecture highlighting a non-hierarchical joining of adjacent hardware containers in accordance with the disclosed subject matter. Both FIGS. 2A and 2B contain the elements of FIG. 1 except that FIG. 2A presents four fixed size hardware behavior containers 44-1, 44-2, 44-3, and 44-4—each of which abuts at least one other hardware behavior container of the same size—and FIG. 2B shows the joining of containers 44-1, 44-2, and 44-3.

The system architecture of both FIGS. 2A and 2B comprise: software programmable computing device 30 hosting reconfigurable logic manager 32 (comprising a reconfigurable computing interface and management software) that manages reconfigurable computing device 40 via configuration channel 36 connected to configuration interface port 38 and operational channel 42 connected to operational interface port 46. Software programmable computing device 30 hosts one or more software applications, such as software application 34 that with the assistance of reconfigurable logic manager 32, exploit functional behaviors hosted by reconfigurable computing device 40. These functional behaviors are loaded into reconfigurable computing device 40 as they are required by executing the software applications, such as software application 34, on software programmable computing device 30. Reconfigurable computing device 40 hosts four fixed size hardware behavior containers 44-1, 44-2, 44-3, and 44-4.

In a simple FPGA configuration case, reconfigurable logic manager 32 exploits the reconfigurable computing resource 40 viewing the available hardware behavior containers 44-1, 44-2, 44-3, and 44-4 as four fixed-size regions. However, using a base system, it would not be possible to load a hardware behavior if the current task load on the software programmable computing host 30 entails a demand for a hardware behavior that will not fit in a single hardware behavior container. This is because there is no available hardware behavior container (44-1, 44-2, 44-3, and 44-4) of sufficient size available.

The disclosed subject provides a solution wherein a temporary joining of two or more abutting hardware behavior containers form a container sufficient in size to host the larger hardware behavior requested. For example, as shown in FIG. 2B, if the desired behavior requires the space of three of the fixed-size hardware behavior containers then reconfigurable logic manager 32 joins, in effect, the containers (shown as 44-1, 44-2 and 44-3) to form a reconfigurable region of sufficient size. The loaded hardware behavior uses only one of the three combined hardware containers interfaces (44-1, 44-2 or 44-3), shown as 44-1' in FIG. 2B, to communicate with operational interface port 46 and operational channel 42. The remainder of the space provided by the other two hardware behavior containers is used to host the behavior.

This circumstance represents a non-hierarchical use of the disclosed subject matter which enables the dynamic resizing of available hardware behavior containers as a means of avoiding thrashing and other inefficiencies that are caused by a dynamic and variable workload for a set of fixed-size hardware behavior containers on the reconfigurable computing resource. There are seven different combinations of potential hardware behavior container arrangements for reconfigurable computing resource shown in FIG. 2A that may be configured depending on the size of the container required: 1) an arrangement of four separate hardware behavior containers (the combination of 44-1, 44-2, 44-3, and 44-4 shown in FIG. 2A); 2) an arrangement joining the top three hardware behavior containers (44-1, 44-2, and 44-3) as a single container with the bottom container (44-4) to operating independently of the top temporarily joined container (shown as 44-1' shown in FIG. 2B); 3) an arrangement joining the top two containers (44-1 and 44-2) together and using the bottom two containers separately; 4) an arrangement joining the top two containers (44-1 and 44-2) together and joining the bottom two (44-3 and 44-4) together at the same time; 5) an arrangement joining the middle two containers (44-2 and 44-3) together and using the top and bottom containers separately; 6) an arrangement joining the bottom two containers (44-3 and 44-4) together and using the top two containers separately; and 7) an arrangement using the top container separately and joining the bottom three containers together (44-2, 44-3, and 44-4).

Joining adjacent fixed-size behavior containers enables a substantial increase in available hardware behavior container size flexibility while still abiding by the stringent electrical rules imposed by the underlying FPGA devices allowing the reconfigurable computing capability. In practice, using larger FPGA devices may allow for more configurations readily achievable using this technique under the management and control of the reconfigurable logic manager, with each region readily separable and reclaimable when the hosted hardware behavior is no longer required.

Figure 3A:
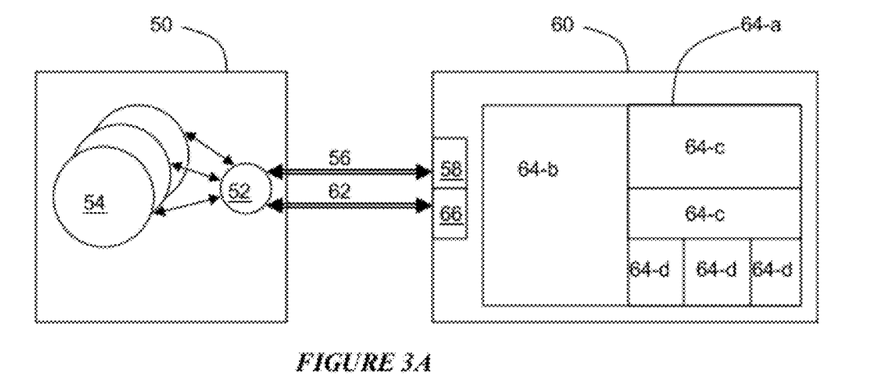
FIGS. 3A, 3B, and 3C are diagrams of embodiments of the system architecture highlighting dynamic reconfigurable hierarchical hardware containers in accordance with the disclosed subject matter.
Figure 3B:
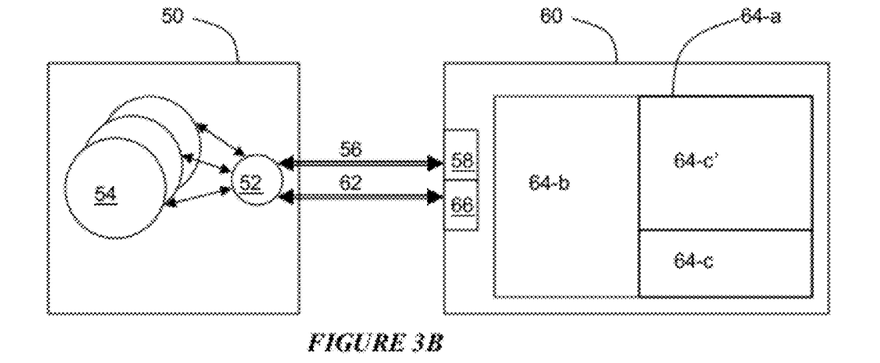
Figure 3C:
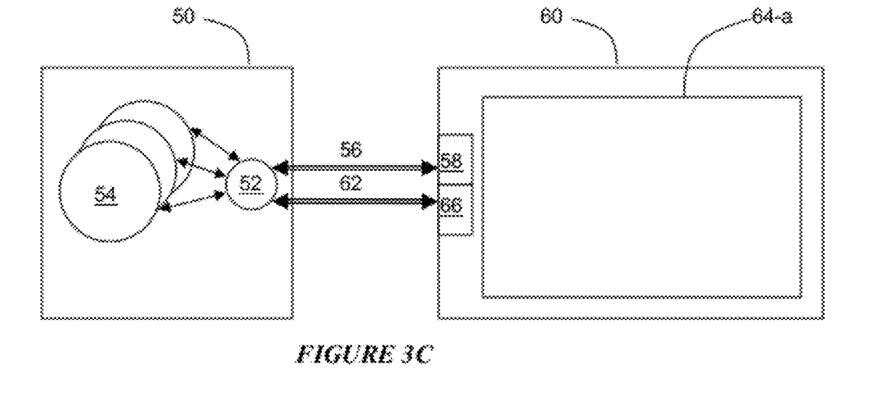

The disclosed subject matter directly addresses the inefficiencies resulting from fixed hardware behavior container sizes. FIGS. 3A, 3B, and 3C are diagrams of embodiments of the system architecture highlighting dynamic reconfigurable hierarchical hardware containers in accordance with the disclosed subject matter. The systems depicted in FIGS. 3A, 3B, and 3C contain the elements of FIG. 1 and also various configurations of hierarchical hardware container 64-a. The various depictions of arrangements of hierarchical hardware behavior containers may be temporarily grouped or joined by abutting in order to illustrate the significant degree of flexibility in hardware behavior container sizing the present disclosure provides.

The system architecture of FIGS. 3A, 3B, and 3C comprise: software programmable computing device 50 hosting reconfigurable logic manager 52 (comprising a reconfigurable computing interface and management software) that manages reconfigurable computing device 60 via configuration channel 56 connected to configuration interface port 58 and operational channel 62 connected to operational interface port 66. Software programmable computing device 50 hosts one or more software applications, such as software application 54 that with the assistance of reconfigurable logic manager 52, exploit functional behaviors hosted by reconfigurable computing device 60. These functional behaviors are loaded into reconfigurable computing device 60 as they are required by executing the software applications, such as software application 54, on software programmable computing device 40. In FIGS. 3A, 3B, and 3C hosts various hierarchical configurations of hardware container 64-a.

Consider the hierarchical case depicted in FIG. 3A in which the top-most container, 64-a, is configured into hardware containers 64-b, two hardware containers labeled 64-c, and three hardware containers labeled 64-d. The letter following the designation of each hierarchical behavior container depicts its level in the hierarchy; with the top designated as level 'a' and each lower level advancing the letter by one through the alphabet. The top-most container is 64-*a*, and the smallest leaf-node containers are labeled as hardware hierarchical behavior containers 64-*d*. The hierarchical behavior container marked 64-*b* is a large region just below the top-level of the hierarchy, while the areas marked 64-*c* and 64-*d* when formed into union, represent a second large hierarchical behavior container at the "b" level. The "b" level container on the right is further decomposed into three containers at the 'c' level of the hierarchy. And the bottom of the three 'c' level containers is further decomposed into three hierarchical behavior containers at the 'd' level.

In FIG. 3A, each of the leaf-node hierarchical behavior containers are loaded individually with its own hardware behavior. Note that not all levels of the hierarchy are or need be represented at each level in the hierarchy tree. For example, there are two hierarchical hardware behavior containers at the 'b' level, but only one of these is further decomposed into three lower level 'c' containers, and that only one these is further decomposed into three lever level 'd' containers.

The arrangement depicted in FIG. 3A is intended merely as an illustration of one configuration embodiment as in practice, the hierarchical decomposition may continue until the smallest partially reconfigurable region physically allowed by the electrical rules imposed by the underlying FPGA devices is reached. Each of these smallest reconfigurable regions may then be joined together, as deemed most optimal for the specific reconfigurable computing resource 60, the expected workload emanating from the software-programmable computing device 50, and its battery of application software instances, such as software application 54.

Following much the same means as described above for FIGS. 2A and 2B, the hierarchical behavior containers in FIGS. 3A, 3B, and 3C at any level in the hierarchy may be exploited in one of three ways: 1) the container may be used in its entirety as a discrete hardware behavior container; 2) the container's component hardware behavior containers (next-lower level in the hierarchy) may be joined temporarily through abutment; or 3) the container's component hardware behavior containers may be used individually, in which case the same selection process may continue recursively through the hierarchy until the leaf-nodes are reached.

FIG. 3B shows an arrangement in which some of the hierarchical hardware behavior containers are joined based on hierarchy (i.e., all three containers at the 'd' level are joined to host one hardware behavior), and some are joined by abutment (i.e., the two hierarchical hardware behavior containers labeled at level 'c' combine to form 64-*c*' in FIG. 3B).

FIG. 3C shows the same system with a single large hardware behavior mapped into the 'a' level of the hierarchical behavior containers (64-*a*), making possible the simultaneous hosting of only one hardware behavior on reconfigurable computing resource 60. These figures are intended merely to illustrate the highly flexible nature of the present disclosure and clearly do not depict all possible configurations.

Importantly, the maximum number of potential hierarchical behavior containers for a given reconfigurable computing resource is fixed by the electrical characteristics of the target resource. Specifically, for certain partially reconfigurable devices, such as those from vendor Xilinx, Inc. for example, the physical position of "BUS MACRO" structures throughout the device determines the boundaries of partially reconfigurable regions. These structures may vary somewhat from family to family of reconfigurable computing devices offered by a particular vendor, such as Xilinx, Inc., but for the purposes at hand, the "BUS MACRO" structures serve to delineate the electrically safe "edge" of a partially reconfigurable region. Such structures are typically positioned at regular intervals around a given reconfigurable computing device type.

For the purposes of describing how the hierarchical and joinable containers are exploited during operation, consider the collection of containers depicted in FIG. 3A. Each rectangle within the largest rectangle representing the top level of the hierarchy of behavior containers, shown as 64-*a*, also defines a behavior container whose internal boundary is defined by "BUS MACRO" structures. Thus the initial top-level configuration of reconfigurable computing device 60 establishes the top-level structures necessary for interaction with software-programmable computing device 50 and its battery of application software instances, such as software instance 54. In addition, the initial configuration also includes the collection of hierarchical behavior containers at their finest level of decomposition, referred to as a "leaf" container herein. In the context of a hierarchical representation, this initial configuration of hierarchical behavior containers represents the entire collection of leaf nodes. At each level of the hierarchy, the interior of a given container is delineated by "BUS MACRO" structures so that each container may readily and safely be addressed as the target for a partial reconfiguration operation. Lower hierarchical levels of the hierarchy are created (and recreated during operation as needed) by loading them as empty behaviors regions with only their boundary "BUS MACRO" structures and the related interconnect necessary to provide communications of the data and control signals required for operation of target behaviors as they are loaded.

Figure 4A:
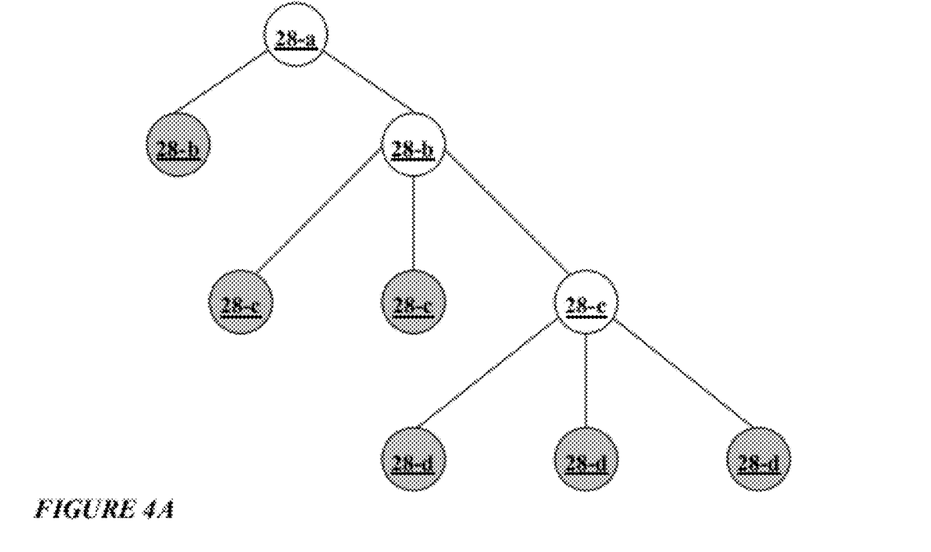
FIGS. 4A, 4B, and 4C are graphical depictions of the hierarchy of the behavior containers shown in FIGS. 3A, 3B, and 3C.
Figure 4B:
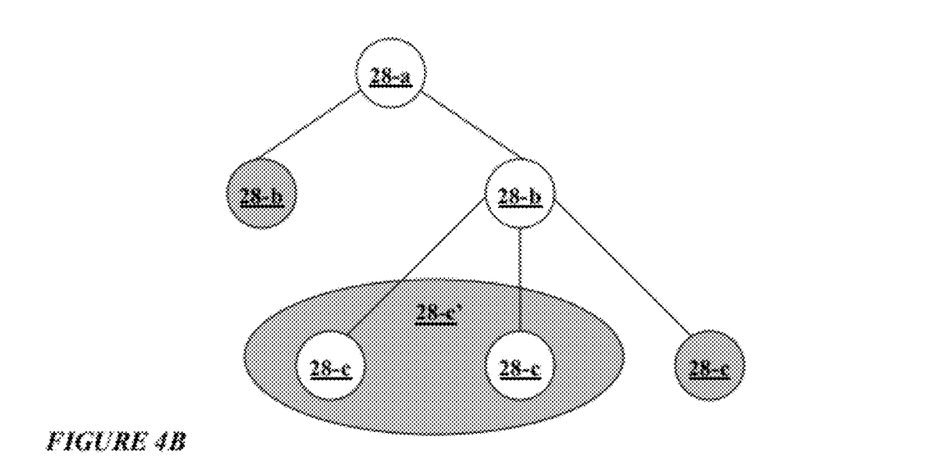
Figure 4C:
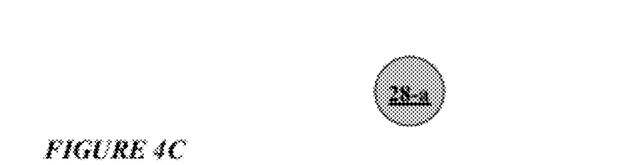

FIGS. 4A, 4B, and 4C are graphical depictions of the hierarchy of the behavior containers shown in FIGS. 3A, 3B, and 3C. The initially loaded configuration of behavior containers are represented by the set of leaf nodes marked with gray fill patterns.

The full hierarchy of behavior containers in FIG. 3A is depicted in FIG. 4A. FIG. 4B reflects the arrangement of reconfigurable computing regions depicted in FIG. 3B. And finally in FIG. 4C, the hierarchy collapses to a single top-level behavior container that represents the largest available reconfigurable computing region in FIG. 3C.

Figure 5:
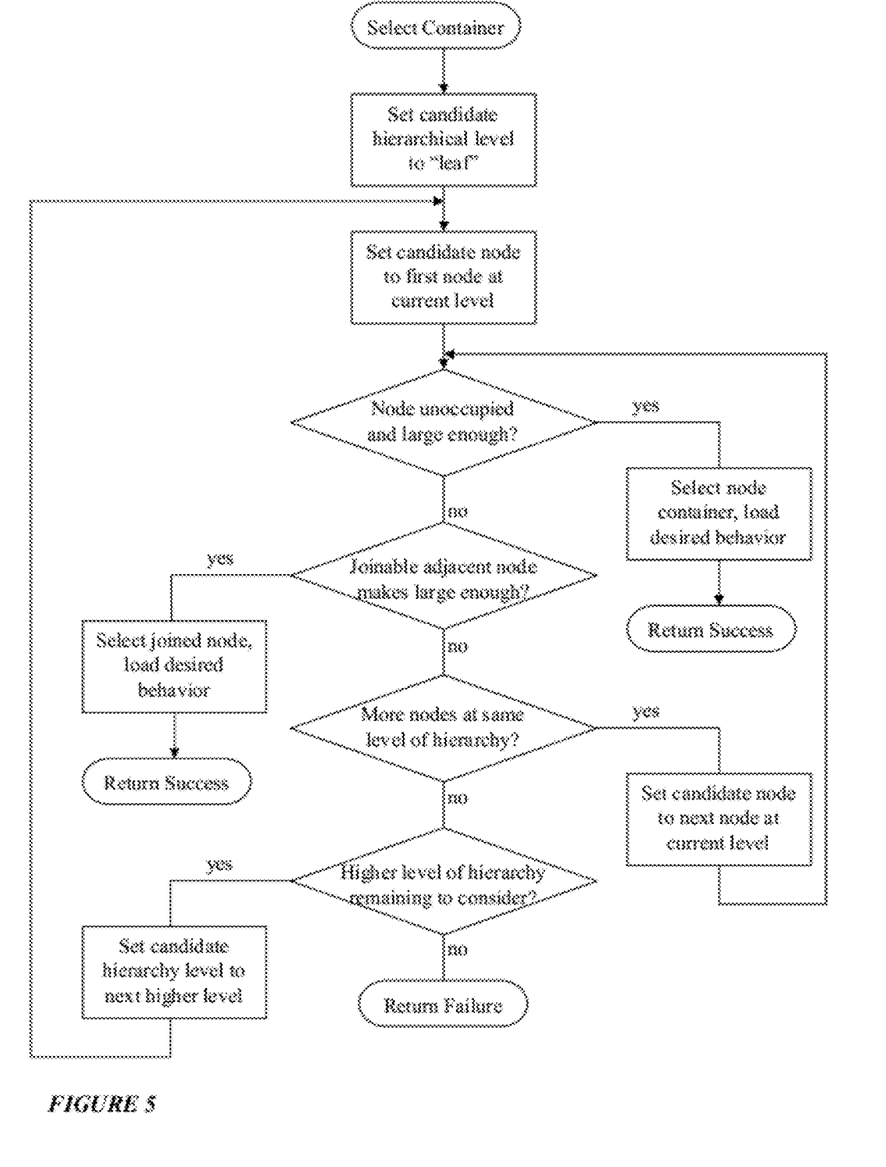
FIG. 5 is a diagram showing the hierarchical decision process used to select behavior containers given a specific loadable behavior requested by an application process.

FIG. 5 is a process flow showing the hierarchical decision process used to select behavior containers given a specific loadable behavior requested by an application process. The sequence begins at the smallest sized containers, known as the "leaf" level of the hierarchy, and proceeds by considering the following for each container (herein also called a node) at that level: is the node being considered currently unoccupied and if so, will it hold the target behavior? If the answer is yes, then the target behavior is loaded into this candidate region and an indicator of success is returned to the requesting application process. If the candidate region is occupied, then the decision process proceeds to the next node at the current level.

If the current candidate region at a given level of the hierarchy is unoccupied and an adjacent region at the same level is also unoccupied, then the decision process considers whether the region represented by the joining of these two adjacent unoccupied regions would be sufficient to hold the target behavior. If the region is large enough, then the target behavior is loaded into this combined region and the decision process returns an indicator of success to the requesting application process. While not shown explicitly in FIG. 5 for the sake of simplicity, the process of considering joining adjacent unoccupied reconfigurable computing regions continues iteratively until one of the following events occurs: the combined region is of sufficient size to host the target behavior; the next adjacent region to be considered is occupied; or no more nodes remain at the current level of the hierarchy.

If all nodes within a given level of the hierarchy have been considered without success in identifying an appropriate candidate to host a given requested target behavior, then, as shown in FIG. 5, the candidate hierarchical level is decremented (i.e., moved one level closer to the top/largest level of the hierarchy), and the process continues to consider the nodes at that level in the hierarchy. This process proceeds upward through the levels of the hierarchy until either a successful candidate region is identified and loaded with the behavior, or all candidate regions are considered without success, in which case an indicator of failure is returned to the calling application process. In the case that no suitable host reconfigurable region is found, the default behavior is to employ a software-only implementation of the target behavior so that the required functionality can still be accessed, albeit at a slower speed than would be possible were a reconfigurable region employed to realize a hardware version of the same behavior.

Alternative embodiments of the decision process depicted in FIG. 5 may improve the operational utility of the present disclosure. Most critical among these is the objective of preferring to employ reconfigurable regions that, all else being equal with respect to other suitable candidate regions, are in the closest proximity to other already loaded regions. The objective of this refinement is to prefer to group loaded behaviors together thereby yielding the greatest likelihood that regions that remain unoccupied will also then likely be in close proximity. Such unoccupied regions in close proximity are more likely to be joinable either through adjacency or through hierarchical joining, leaving the free space within the reconfigurable computing resource with maximum flexibility and utility for the consideration of new requested target behaviors.

An additional technique for the purpose of co-locating loaded target behaviors in accordance with the present disclosure is to borrow the notion of force-directed placement—a concept used in certain floor-planning and placement algorithms and tools for integrated circuit layout. In force-directed placement, occupied regions are thought to exert a "gravitational pull" on other regions based on the inverse of the square of the distance between the regions multiplied by the mass of the occupied region (as predicted by the basic gravitational theory). Using this approach, large occupied regions that are close to a given candidate region will exert a greater gravitational force on a candidate region than smaller regions that are further away. The "mass" of a given occupied region is modeled as a simple function of its area, with any consistently applied figure of merit reflecting the area equally suitable.

Thus, by selecting the suitable candidate region that has the highest sum of gravitational forces exerted on it by all occupied regions, the candidate is also likely to exhibit the greatest proximity to currently loaded regions—a key effect of the present disclosure. The extension of the decision process shown in FIG. 5 to incorporate this refinement requires that, for each candidate region that is of suitable size, all occupied nodes be traversed to calculate the gravitational force on the candidate. Also, instead of stopping when the first suitably sized unoccupied region is identified, this refinement to FIG. 5 requires that all unoccupied reconfigurable regions be considered and scored with respect to the gravity exerted by other currently occupied regions.

Different versions of each loadable target behavior it manages sized to fit specific candidate reconfigurable regions must be maintained. This requirement stems from the variability of the physical structure of partially reconfigurable device types. And while there may be a great deal of variability, there is also much physical structure regularity so that as typically configured, reconfigurable regions of the same size are likely to also be arranged so that they reflect the same internal physical structure. Thereby enabling the use of a single form-factor version of a loadable target behavior to be loaded into any of a number of regions with matching physical characteristics. These different versions of loadable target behaviors may be managed in compressed form using run-length encoding to minimize system storage requirements and/or in encrypted form using a cipher algorithm suitable to the operational environment, without affecting the applicability of the disclosed subject matter.

In operation, the disclosed subject matter provides a means and technique for substantially improving the efficacy and efficiency of the dynamic use of reconfigurable computing resources in systems comprising both general-purpose software-programmable computing resources and one or more reconfigurable computing resources. This is of particular relevance to systems of this class with reconfigurable computing resources capable of supporting partial dynamic reconfiguration in which a portion of the reconfigurable device can be reconfigured while the remainder of the device continues to operate normally. Because of device-level electrical constraints found in the field programmable gate array (FPGA) devices implementing partial dynamic reconfiguration, it is necessary to delineate precise boundaries around the regions intended to be used for partial dynamic reconfiguration. The disclosed subject matter builds on a system in which a software-programmable computing host manages and controls one or more reconfigurable computing resources and loads hardware behaviors into hardware behavior containers (i.e., the precisely delineated regions in the reconfigurable computing resource targeted for partial dynamic reconfiguration) at run-time to make their functionality available for use by one or more application software instances executing on the software-programmable host. In this system, the disclosed subject matter embodies a means and technique for making the hardware behavior containers dynamically flexible in both size and number. This is achieved using both abutment and hierarchical decomposition of hardware behavior containers to provide comparatively fine-grain control over available reconfigurable computing resources (as embodied by the hardware behavior containers), varying both size and count, as the workload varies.

The foregoing description of the preferred embodiments is provided to enable any person skilled in the art to make or use the claimed subject matter. Various modifications to these embodiments will be readily apparent to those skilled in the art, and the generic principles defined herein may be applied to other embodiments without the use of the innovative faculty. Thus, the claimed subject matter is not intended to be limited to the embodiments shown herein but is to be accorded the widest scope consistent with the principles and novel features disclosed herein.

What is claimed is:

1. A method for flexible loading of a hardware behavior on a reconfigurable computer resource managed by a soft-ware programmable computing host, comprising the steps of:

defining a configuration of hierarchical behavior container regions on said reconfigurable computer resource according to allowable electrical boundary limitations of said reconfigurable computer resource;

selecting a hierarchical behavior container on said reconfigurable computer resource to load said hardware behavior according to a hierarchical process wherein said hardware behavior is loaded into the smallest hierarchical behavior container available in a configuration of hierarchical behavior container regions on said reconfigurable computer resource; and loading said hardware behavior into said selected hierarchical behavior container.

2. A method for flexible loading of a hardware behavior on a reconfigurable computer resource managed by a soft-ware programmable computing host, comprising the steps of:

defining a configuration of behavior container regions on said reconfigurable computer resource according to allowable electrical boundary limitations of said reconfigurable computer resource;

selecting the smallest behavior container on said reconfigurable computer resource to load said hardware behavior according to an dynamic process wherein abutting hardware behavior container regions may be temporarily joined to load said hardware behavior into the smallest hierarchical behavior container available in a configuration of hierarchical behavior container regions on said reconfigurable computer resource; and loading said hardware behavior into said selected hierarchical behavior container.

* * * * *